United States Patent [19]

Shurden

[11] Patent Number: 4,766,692

[45] Date of Patent: Aug. 30, 1988

[54] ANIMAL TRAP

[76] Inventor: Charles H. Shurden, Rte. 4, P.O. Box 512, Starkville, Miss. 39759

[21] Appl. No.: 111,069

[22] Filed: Oct. 22, 1987

[51] Int. Cl.$^4$ .............................................. A01M 23/30
[52] U.S. Cl. ............................................. 43/78; 43/61
[58] Field of Search .................................. 43/78, 85, 61

[56] References Cited

U.S. PATENT DOCUMENTS

| | | | |
|---|---|---|---|
| 225,763 | 3/1880 | Quigley | 43/81 |
| 365,763 | 6/1887 | Swan | 43/79 |
| 432,139 | 7/1890 | Kerns | 43/78 |
| 690,171 | 12/1901 | Mills | 43/61 |
| 1,641,062 | 8/1927 | Bacon | 43/78 |
| 2,104,083 | 1/1938 | Krahl | 43/78 |
| 2,669,056 | 2/1954 | Lehman | 43/79 |
| 4,016,672 | 4/1977 | Joncas | 43/78 |

*Primary Examiner*—Gene P. Crosby
*Attorney, Agent, or Firm*—Breneman & Georges

[57] ABSTRACT

An animal trap of the guillotine type primarily for the capture of mice comprises a housing with an opening for the forebody of an animal. The trap includes a spring biased guillotine member mounted in tracks in a pair of parallel uprights on opposite sides of the opening such that a guillotine member is able to reciprocate between open and closed positions in relation to the opening in the housing. The guillotine member includes detents for releasably engaging the housing assembly and holding the guillotine member in an open set position. The trap further includes a slidable striker member which is spring biased laterally towards the guillotine member and designed to disengage the guillotine member from an open set position by striking the lower portion thereof. A pivotally mounted bait lever projects downward into the housing assembly and includes a detent for releasably engaging the striker member and holding the striker member in a retracted set position. The trap is triggered by a downward pivoting movement of the bait lever to release the striker member which impacts and releases the guillotine member. The trap is intended to strike the neck of the animal causing spinal dislocation or suffocation without dismembering the animal.

22 Claims, 3 Drawing Sheets

ANIMAL TRAP

BACKGROUND OF THE INVENTION

1. Field of the Invention

The present invention pertains to a novel animal trap providing primarily for the capture of mice and other small rodents. More particularly the invention pertains to a trap of the guillotine type for the effective an efficient entrapment of small rodents by a reciprocating guillotine member which strikes and kills the rodent by either spinal dislocation or suffocation without the severing of the head from the body. The invention is safe to use around small children since there is little risk of injury to a child if the trap is accidently released. In addition, the trap can be set and handled without risk of the users hands or fingers becoming caught.

2. Description Of The Prior Art

The control and elimination of the infestation of mice and other small rodents has always been of major concern to homeowners, shopkeepers and farmers. It has long since been known that mice and rats have the ability to carry and spread paracites such as fleas, lice and ticks as well as the many diseases associated with the paracites. For these reasons it is a major health concern to control or eliminate the population of mice and rats in the areas inhabited or frequented by humans.

In addition, mice and rats are known to be quite destructive to property by chewing on furniture, and baseboard moldings as well as plastic materials and in particular polyvinyl chloride products such as PVC pipe and electrical wire insulation. As a result the presence of mice and rats due to their destructive nature pose serious health and safety considerations for humans as well as expensive repairs to houses and buildings.

These undesirable characteristics of mice and rats has led to numerous attempts to eliminate rodent infestation by a number of methods including the use of traps or poisons. Poisons have the distinct disadvantage of posing a health risk to humans, especially small children who may unknowingly handle the poison. In addition the use of poison has become of major concern in recent years in view of the sometimes permanent environmental impact through the use of non-biodegradable pesticides such as DDT. Moreover, the use of poison creates the risk of poisoning desirable and harmless animals or pets and the poisoned animals expiring in undesirable or inaccessable areas which prevent their proper disposal. As a result the use of poison has a very limited practical utility and is not suitable for use in areas where pets and humans, especially small children, may be exposed to the dangers of using poison.

The efforts to control or eliminate the infestation of mice and rats have also concentrated on mechanical devices to capture the animal. These devices may be classified generally into those which capture the mouse or other animal live for later relocation or disposal and those which kill the animal instantly.

Those prior art devices which attempt to capture the animal live generally employ a suitable housing having a door which either pivots or slides when actuated by a bait lever. Examples of such prior art devices may be found in Woolworth U.S. Pat. No. 2,524,504, Symens, U.S. Pat. No. 2,478,605 and Mills U.S. Pat. No. 690,171. These devices have the disadvantage of being of a relativly large size in order to capture the animal and the difficulty of enticing the animal to enter the trap a distance necessary to trip the device. Such capturing devices further have the disadvantage of creating the burden of relocating or otherwise disposing of the animal.

The prior art is replete with devices whose aim is to instantly kill the mouse or other animal. The prior art devices usually utilize either a member which impales the mouse or a member which strikes the mouse with a deadly blow. One such example of the latter type of device is disclosed in Swan, U.S. Pat. No. 365,763. In this example of the prior art a housing includes a reciprocating guillotine jaw member at its opening which when released closes on the neck of the mouse to either dislocate its spine or cause suffocation. The mechanism is activated by a food bait lever to trip a latch holding a hook member to release the spring biased guillotine jaw. The trap disclosed in Swan U.S. Pat. No. 365,763 has the disadvantage of utilizing a cord extending from the guillotine member and around a pulley to the hook. This arrangement results in the tendency of the cord becoming tangled thereby preventing effective operation of the device.

Additionally, the arrangement utilized by Swan U.S. pat. No. 365,763 requires that the bait lever be pulled toward the mouse as when pulling the food from the lever in order to trigger the device. Should the mouse not pull the food from the lever or if the food is not tightly adhered to the bait lever the device may not be triggered when the mouse removes the bait where upon the mouse may escape.

A further example of a prior art device is disclosed in Owen U.S. Pat. No. 103,767 which employs a scissor type of mechanism for trapping the head of the animal. The device of the Owen U.S. Pat. No. 103,767 is activated by the pivoting of a bait lever to release the jaw to engage the neck of the animal. The Owen U.S. Pat. No. 103,767 device has the disadvantage of being difficult to set with a risk of the users hands or fingers becoming caught in the jaws resulting in substantial injury.

The prior art also includes a number a devices having a lever mechanism for activating a spring biased bar such as for example Quigley, U.S. Pat. No. 225,763. In this prior art example the spring biased bar is activated by a mouse walking on a treadle which unlatches an arm to release the bar which then swings downward across the path of the mouse striking it on the head or neck. This type of prior art device utilizing a treadle release has the disadvantage of requiring a greater weight to release the device than other arrangements and as a result may allow mice or other small animals to pass by without being trapped. In addition, such an arrangement makes it difficult to set and handle the trap due to the risk of injury to the operator when handled.

A further example of the prior art is disclosed in Lehman, U.S. Pat. No. 2,669,056 relating to a guillotine type device which encloses the entire body of the mouse when trapped such that the entire device can be discarded. The arrangement of Lehman's device has the disadvantage of requiring the mouse to completely enter the trap before the trap can be triggered. Since mice and other rodents tend not to enter small confining spaces particularly when insufficient light is allowed to enter the effectiveness of the trap is significantly reduced. A further disadvantage of devices similar to Lehman is the difficulty in setting the trap when the trigger is positioned inside the housing and not readily reached by the user. As with the other prior art devices this arrangement creates a risk of injury to the user when setting the trap.

The above described prior art traps have not been completely effective in trapping mice or other rodents as evidenced by the many attempted improvements. These devices have generally relied on rather complicated arrangements of springs and latches which have been characteristically expensive, difficult to manufacture and are subject to failure making the trap ineffective.

The destructive and unsanitary characteristics of mice and other rodents and the lack of success of the prior art traps have created the need for a trap which is reliable, inexpensive, easy and safe to operate, easy to clean and durable offering an extended life.

The present invention is directed primarily to a mousetrap which is inexpensive, reliable and effective. The mousetrap according to the invention is safe to use around small children since it is of a design which can be safely handled and moved without the danger of the users hands or fingers becoming caught or injured in the mechanism. In addition, the mousetrap according to the invention does not utilize any sharp or pointed instruments which strike the mouse thereby further reducing the risk of injury to the user.

SUMMARY OF THE INVENTION

The disadvantages and limitations of the prior art mousetraps are obviated while providing for the effective trapping of mice. The invention is of a rugged and durable construction providing reliable service over an extended period of time. In addition, the mousetrap constructed according to the present invention is compact, convenient to clean and easy to set without risk of injury to the operator.

The novel mousetrap is, in the preferred embodiment, constructed of a light weight rigid plastic material. This type of construction tends to be more durable and easily cleaned compared to the materials used in the prior art devices.

The novel mousetrap is of the guillotine type comprising a guillotine or blade-like member which strikes the neck of the mouse to inflict fatal injuries without severing the head from the body. The guillotine member is spring biased to kill the mouse by suffocation or spinal dislocation without severing the head thereby allowing easy cleaning of the trap and disposal of the dead mouse.

The novel mousetrap according to the invention comprises a box-like housing having an entrance. Adjacent either side of the entrance is pair of uprights having a vertical track. The guillotine member is fitted within the tracks in the uprights to reciprocate from an open set position to a closed tripped position to close the entrance of the trap. In the preferred embodiment the gullotine member includes a pair of detents which releasably engage the upper edge of the housing to hold the guillotine member in the open set position.

The upper face of the housing includes a grooved track extending the entire length of the housing. A spring biased striker member slides within the track toward the guillotine member to impact the guillotine member to release the detents on the guillotine member from the housing.

A suitable bait lever is pivotally mounted within the housing with its free end directed toward the entrance of the housing. Disposed on the bait lever is a detent which is positioned to engage a recess on the lower face of the striker member to hold the striker in a retracted set position.

In operation the guillotine is raised to its open set positon by engaging the detents against the housing. Subsequently the striker member is retracted away from the gullotine and secured in the set position by engaging the detent of the bait lever with the recess in the striker element. When a mouse enters the housing and tampers with the bait lever, as by attempting to remove the bait placed thereon, the bait lever will pivot downwardly thereby releasing the striker member. The striker member being spring biased then strikes the guillotine member to disengage the detents from the housing. The guillotine member then slides downward and strikes the neck of the mouse which dies by either suffocation or spinal dislocation.

The arrangement of components of the mousetrap provides for the safe and easy setting of the trap without the risk of injuring fingers or hands by inadvertant triggering of the device. In addition, the novel arrangement of components requires only a relatively small force to release the striker member which is independent of force delivered by the spring biased guillotine member. The mousetrap according to the invention is inexpensive to manufacture and maintain which is able to utilize a standard rubber band for spring biasing the movable members thereby eliminating the need for expensive specially designed springs. Additionally, use of standard rubber bands enables easy replacement and ensures long reliable service.

BRIEF DESCRIPTION OF THE DRAWINGS

Other advantages of the invention will become apparent to those skilled in the art from the following detailed description of the invention in conjunction with the accompanying drawings in which.

DETAILED DESRIPTION OF THE INVENTION

The present invention is directed to a novel mousetrap for the trapping of mice or other small rodents which is effective, durable and easy and safe to operate. The invention is useful in any environment but is particularly useful in the home due to the simplicity of operation and relatively low risk of injury to the user or small children which may come into contact with the mousetrap. Additionally, the novel mousetrap is, in the preferred embodiment, made of a durable plastic material which can be easily cleaned providing many years of dependable service.

Figure 1:
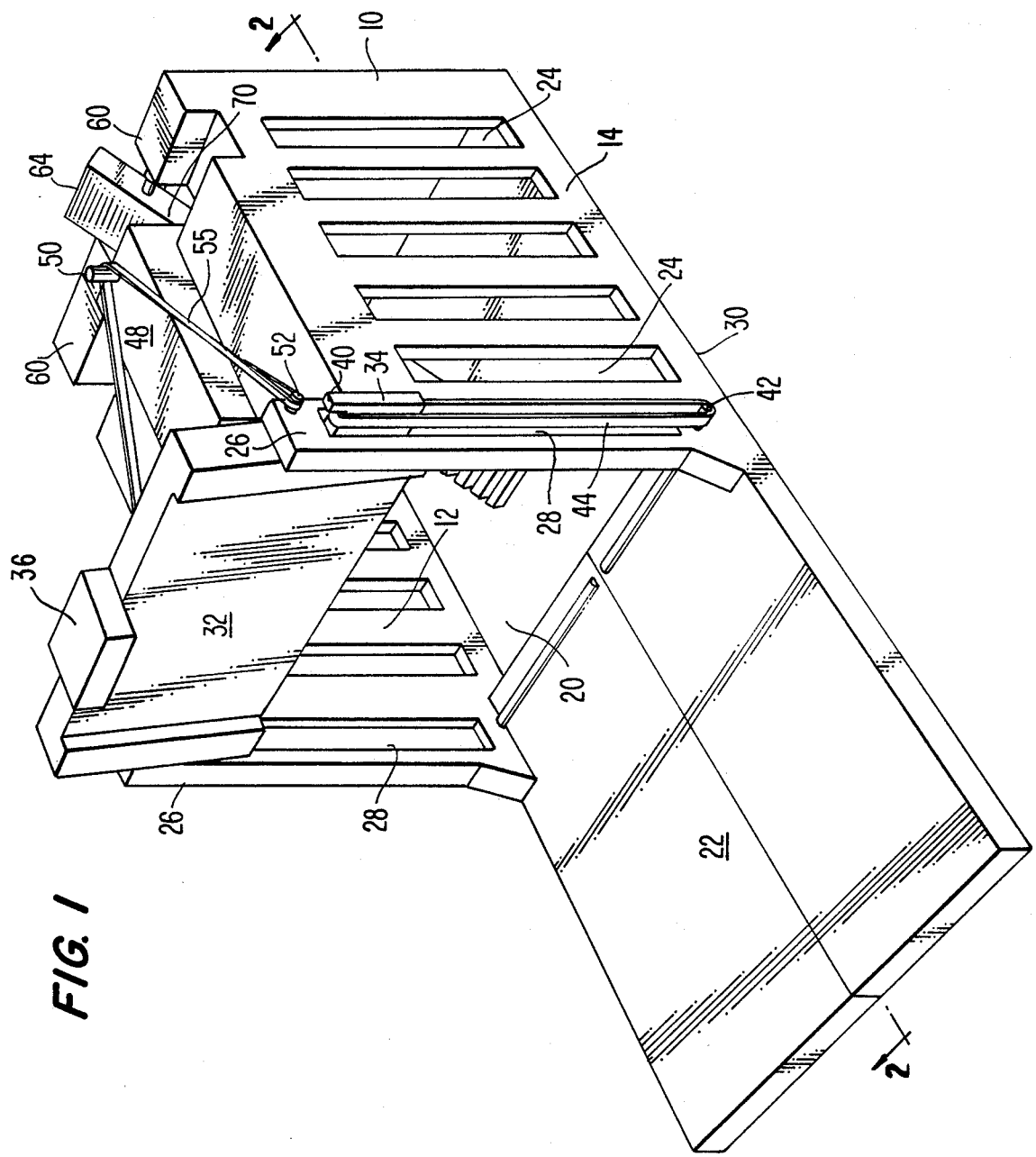
FIG. 1 is a perspective view of the novel mousetrap with the guillotine member in the open set position and the striker member in the retracted set position.

Referring to FIG. 1 the mousetrap according to the invention comprises a housing 10 having an essentially rectangular box-like shape. As can be seen, the housing 10 includes a right side 12, left side 14, rear side 16 and upper side 17. The housing further includes a lower opening 18 for easy access into the trap and an entrance 20 opening to the interior of the housing 10. A ramp 22 adjacent the entrance 20 serves to stablize the housing in use.

In the preferred embodiment a plurality of windows 24 are provided in the sides 12 and 14 and the rear side 16. These windows are provided for allowing light to enter the interior of the housing 10 thereby providing an inviting atmosphere for mice to enter the trap. This feature contributes to the effectiveness of the novel trap since mice tend to shy away from traps which are dark, confining and threatening in appearance.

The right and left sides 12 and 14 adjacent the entrance 20 each include a vertical upright 26. As can be best seen in FIG. 1 a vertical slot forming a track 28 is disposed within the upright 26 which extends from the uppermost portion of the upright to the lower edge 30 of each side 12 and 14. The tracks 26 are arranged parallel to each other whereby they form a suitable track in which a guillotine member reciprocates as described hereafter in greater detail.

Figure 2:
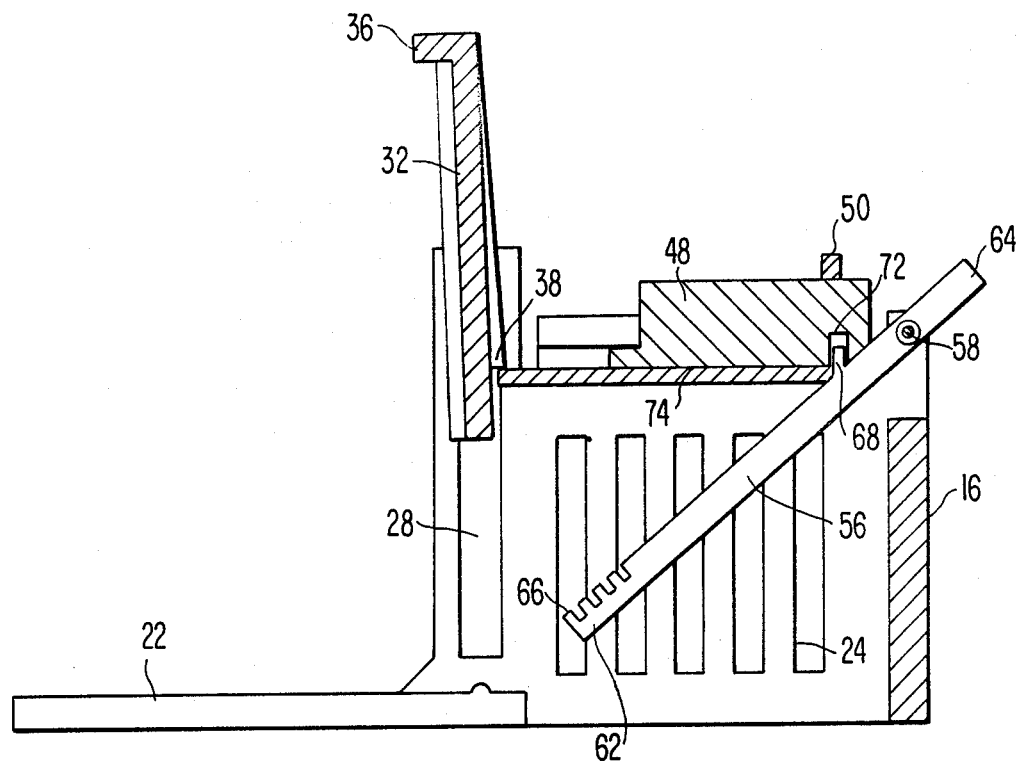
FIG. 2 is a cross sectional view of the preferred embodiment of the novel mousetrap as taken along line 2—2 of FIG. 1.
Figure 5:
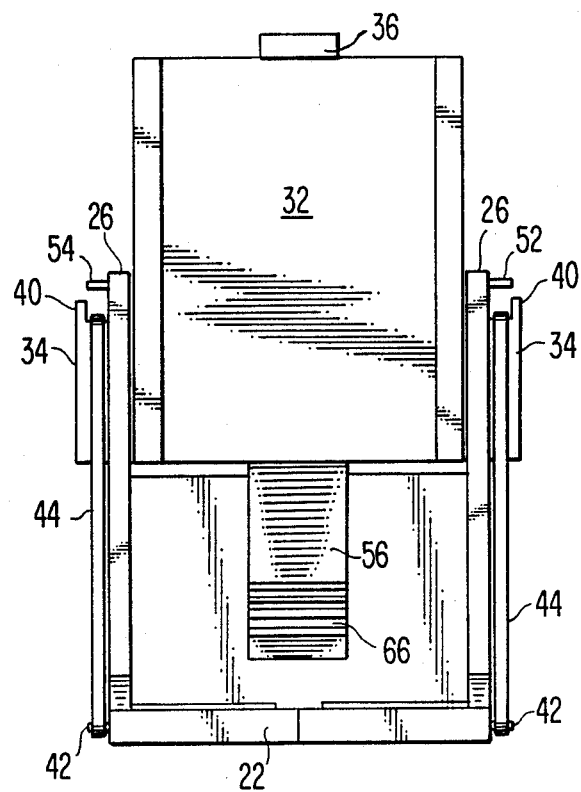

Referring to FIG. 5, a guillotine member 32 includes a pair of outwardly extending arms 34 which are received in the tracks 28 on either side of the entrance 20. At the upper edge of the guillotine 32 is provided a handle 36 to grasp the guillotine member to raise it to the open position. As best shown in FIG. 2 the guillotine member 32 includes a pair of detents 38 on the rear face thereof which are arranged and adapted to releasably engage the upper side 17 of the housing 10 as illustrated in FIG. 2.

Referring to FIG. 1 and FIG. 5 the guillotine member 32 includes a first pair of upwardly extending hooks 40 disposed on the arms 34. Immediately below the tracks 28 a second pair of hooks 42 opening downward projects from the right side 14 and left side 12 respectively. In the preferred embodiment a pair of rubber bands 44 extend from the upper hooks 40 on the guillotine member 32 to the hooks 42 on the housing. The rubber bands 44 are tensioned such that the guillotine member 32 can be manually raised to and maintained in an open set position by the detents 38 engaging the housing 10 as best shown in FIG. 2. It is preferable to use two rubber bands, one for each set of hooks on the gullotine member 32 and housing 10 to provide the maximum force when the guillotine member is released as described hereafter in greater detail. Although the preferred embodiment envisions using inexpensive standard commonly available rubber bands any suitable spring device can be used. For example a leaf spring or coil spring extending from the lower portion of the sides 12 and 14 to the guillotine member 32 may be used with equal success.

Although the preferred embodiment envisions using two separate rubber bands for each set of hooks 40 and 42 it is possible to utilize a single rubber band which is stretched from one hook 40 on the guillotine member 32 downward, under the ramp 22 and upward to the opposite hook 40. As discussed above any suitable tensioning member may be used instead of rubber bands although rubber bands are preferred since they are inexpensive reliable and readily available for replacement.

Figure 3:
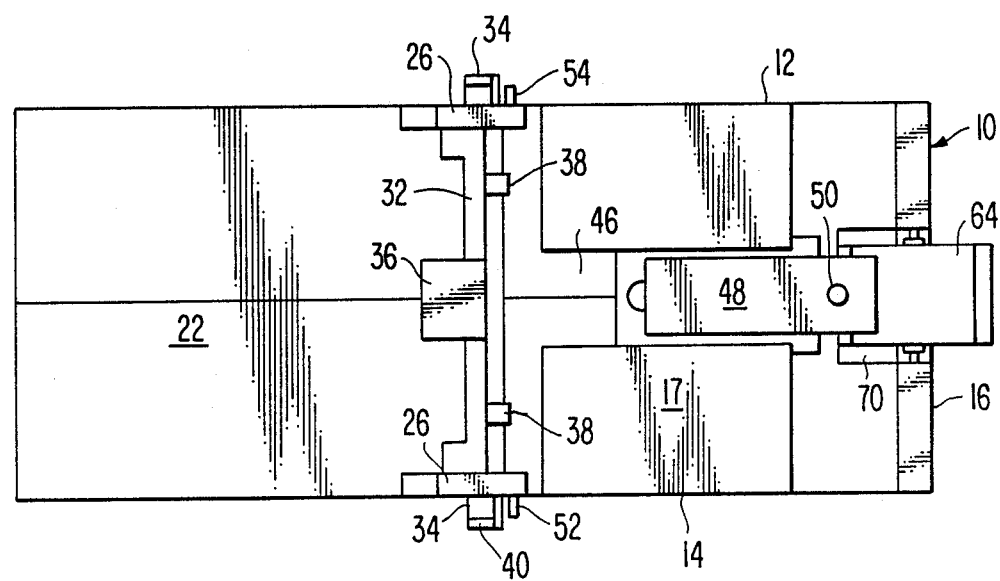
FIG. 3 is a top plan view of the novel mousetrap.
Figure 4:
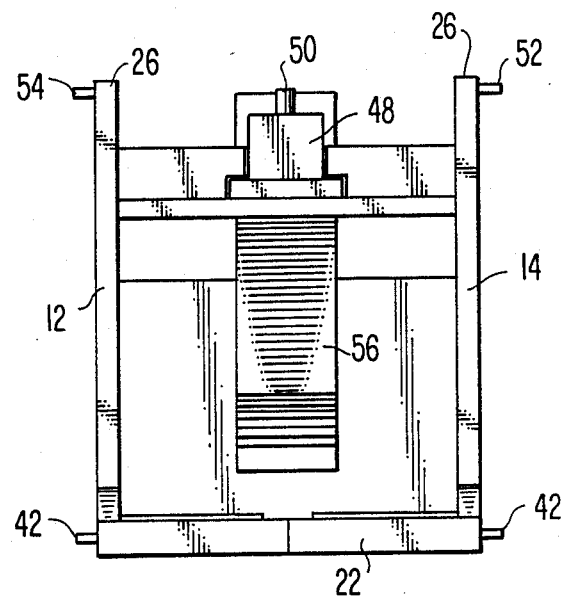
FIG. 4 is a front elevational view of the housing and bait lever of the novel mousetrap; and, FIG. 5 is a front elevational view of the novel mousetrap.

On the top side 17 of the housing 10 as best shown in FIG. 3 a track 46 is provided which slidably receives a striker 48. As can be seen in FIG. 2 and FIG. 3 the striker 48 is provided with a single upright hook 50 which receives a rubber band 55 extending from hooks 52 and 54 on the top side 17 of the housing 10 adjacent the uprights 26. The rubber band is suitably disposed to urge the striker 48 toward the guillotine member 32 with sufficient force to disengage the detents 30 from the top side 17 as described hereafter in greater detail. In the preferred embodiment an ordinary rubber band is used extending from the hook 52 around the hook 50 on the striker 48 to the hook 54 although any suitable spring member can be used.

A bait lever 56 is pivotally mounted at 58 between a pair of uprights 60 on the top side 17 of the housing 10 such that a substantial portion of the lower end 62 of the bait lever 56 is disposed within the housing and a smaller portion of the upper end 64 projects above the top side 17 of the housing 10. The lower end 62 of the bait lever 56 includes a plurality of grooves 68 to receive food or other bait to attract the mice.

The bait lever further includes a detent 68 projecting upward through the opening 70 in the housing 10 as best shown in FIG. 3. Referring back to FIG. 2 the detent 68 in the bait lever 56 is adapted to be received in a recess 72 in the lower face 74 of the striker 48 to hold the striker 48 in the retracted position.

In operation a suitable bait is placed in the grooves 66 of the bait lever 56. The striker 48 is then pulled to the retracted position as shown in FIG. 2 against the tension of the rubber band 55. When retracted the bait lever 56 is pivoted upward until the detent 68 is received in and engages the recess 72 in the striker 48 whereby the striker is held in the set positon.

Once the striker 48 is set the guillotine member 32 is pulled upward until the detents 38 engage the top side 17 of the housing. As shown in FIG. 2 when the lower end 62 of the bait lever 56 is pressed downward, as by a mouse attempting to remove the bait the downward pivoting movement of bait lever 56 will disengage the detent 68 from the striker 48 causing it to slide toward the guillotine member 32 by the tension of the rubber band 55. The striker member 48 once released will impact the guillotine member 32 with sufficient force to release the detents 38 of the guillotine member 32 from the top side 17 of the housing 10 whereby the tension of the rubber bands 44 will snap the guillotine 32 downward thereby striking the mouse.

Once set and baited the mousetrap can be easily carried and placed in a suitable location which mice frequent. When a mouse enters the housing 10 through the entrance seeking the bait and tampers with the bait lever 56 the striker 48 and guillotine 52 will be released in an instantaneous chain reaction. A captured mouse can be disposed of easily by raising the guillotine and removing the mouse from the trap without the need to handle the dead mouse. Once the dead mouse is removed the trap can be cleaned with a suitable detergent to remove any scent and reused as many times as is needed.

The novel arrangement of components provides an instantaneous chain reaction which results in the neck of the mouse being struck by the guillotine member 32 when the mouse tampers with the bait lever 56. The novel mouse trap according to the invention provides a safe and efficient means to capture mice. Since the guillotine member 32 closes vertically across the entrance 20 of the housing 10 the danger of ones hands or fingers becoming caught in the trap are relatively small. The trap, once set, can be handled safely and easily by grasping the trap on the sides of the housing or by the ramp. By grasping the mousetrap in either of these two manners will ensure that fingers are not caught should the trap be inadvertantly triggered. The arrangement further provides improved safety for use around small children since the trap can be handled in many different positions without the childs fingers being caught in the guillotine member. In addition, the device does not include any sharp blades or impaling members which could cause serious injury to the user during setting or handling.

By using separate rubber bands to bias the striker 48 and the guillotine member 32 the force applied to the guillotine member 32 is completely independent of the force needed to pivot the bait lever 56 to trigger the trap. The tension of the rubber band 55 controls the force applied by the striker and the frictional engagement of the detent 68 of the bait lever 56 to the striker 48. Depending on the strength of the rubber band 55 used the friction between the striker 48 and the detent 68 and the amount of force needed to trigger the bait lever can be controlled as desired. In addition, the sensitivity of the trap can be determined by altering the weight of the bait lever 56 since a greater weight tends to pivot the bait lever 56 downward thereby increasing the sensitivity and decreasing the amount of weight needed to trigger the trap.

The novel mousetrap in the preferred embodiment is made of a rigid and durable plastic material which can be easily cleaned to remove all scents of the previous trapped mouse. Such efficient cleaning is essential for a trap to have any extended use since the slightest scent of the previous captured mice will deter mice from entering the trap in the future.

The foregoing detailed discription of the invention is primarily for purposes of illustrating the preferred embodiment of the invention. It will be recognized by those skilled in the art that the preferred embodiment is not intended to limit the present invention to the particular structures and preferred embodiments as set forth above as they may be readily modified by those skilled in the art. It will be further readily apparent to those skilled in the art that numerous other modifications not mentioned here can still be made without departing from the spirit and scope of the invention as claimed in the following claims.

What is claimed is:

1. An animal trap of the guillotine type comprising:
   (a) a housing having a right, left, top and rear side and an entrance conforming essentially to the size of an animal to be trapped;
   (b) a spring biased guillotine member capable of reciprocating between an open set and closed tripped position in relation to said entrance, said guillotine member having means adapted to releasably engage said housing to hold said guillotine member in said open set position;
   (c) a spring biased striker member slidable longitudinally along said housing from a retracted position to a tripped position and adapted for impacting said guillotine member to disengaged said guillotine member from said housing assembly; and
   (d) a pivotally mounted bait lever in said housing having means for releasably engaging said striker member in said retracted position.

2. The animal trap of claim 1 wherein said housing further comprises a pair of parallel spaced-apart vertical uprights on opposite sides of said opening, said uprights having inwardly facing longitudinally extending vertical tracks extending substantially the combined height of the housing and the upright.

3. The animal trap of claim 2 wherein said guillotinne member is slidably received in said vertical tracks.

4. The animal trap of claim 1 wherein said means for releasably engaging said guillotine member with said housing assembly comprises at least one detent to releasably engage the top side of said housing.

5. The animal trap of claim 1 wherein the top side of said housing includes a longitudinally disposed track parallel to the sides of said housing assembly and adapted for slidably receiving said striker member.

6. The animal trap of claim 1 wherein said means for releasably engaging said bait lever with said striker member comprises a detent on said bait lever which is received in a recess in said striker member.

7. The animal trap of claim 3 wherein said guillotine member includes a pair of outwardly extending arms received in the tracks of said uprights, said arms further including upwardly extending first hooks.

8. The animal trap of claim 7 wherein said housing further includes a pair of second hooks disposed below each of said tracks and a first biasing means extending from said first hooks on said arms of the guillotine member to said second hooks below said tracks in the housing.

9. The animal trap of claim 8 wherein said first biasing means comprises a pair of rubber bands extending from said first hook to said second hook for biasing said guillotine member to the closed tripped position.

10. The animal trap of claim 1 wherein said striker and housing includes hook members for receiving a second biasing means to bias said striker toward said guillotine member.

11. The animal trap of claim 10 wherein said second biasing means comprises at least one rubber band.

12. The animal trap of claim 1 wherein said bait lever includes at least one groove adapted for accepting bait.

13. The animal trap of claim 1 wherein said housing assembly is of a substantially rectangular configuration.

14. The animal trap of claim 1 wherein said housing includes a plurality of windows in at least one of its sides.

15. The animal trap of claim 1 further comprising a ramp disposed adjacent said entrance.

16. An animal trap of the guillotine type comprising:
   (a) a housing comprising a right side, left side, rear side and top side and an entrance conforming essentially to the size of an animal to be trapped;
   (b) a pair of vertical uprights extending from said housing adjacent said entrance;
   (c) a pair of opposing vertical tracks extending essentially from a lower edge of said right and left sides of the housing to the top of said vertical uprights;
   (d) a guillotine member having a pair of outwardly extending arms received in said tracks whereby said guillotine member is adapted for reciprocating between an open set position and a closed tripped position;
   (e) a first spring biasing means to bias said guillotine member to said closed tripped position;
   (f) a longitudinal track disposed on the top side of said housing;
   (g) at least one detent on said guillotine member adapted to releasably engage the top side of said housing and retain said guillotine member in said open set position;
   (h) a striker member slidable within said longitudinal track from a retracted position to a tripped position and adapted to impact and release said guillotine member from said open set position, said striker further including a recess in the lower side thereof;

(i) a second biasing means extending from said striker to said top side to bias said striker toward said guillotine member; and (j) a bait lever pivotally mounted in said housing and having a detent adapted for releasably engaging said recess in said striker member.

17. The animal trap of claim 16 wherein said housing further comprises a first pair of hook members and wherein said arms of the guillotine member include a second pair of hook members said first and second hook member adapted for engaging said first biasing means.

18. The animal trap of claim 17 wherein said first biasing means is a pair of rubber bands extending from said first pair of hooks to said second pair of hooks.

19. The animal trap of claim 17 wherein said striker member includes a third hook member and said housing further includes a fourth pair of hook members said third and fourth hook members adapted to receive said second biasing means.

20. The animal trap of claim 16 wherein said second biasing means comprises at least one rubber band.

21. The animal trap of claim 16 wherein said bait lever is pivotally mounted such that a downward movement of said lever releases said striker member.

22. An animal trap of the guillotine type comprising:

(a) a housing of a substantially rectangular configuration having a right and left side, top side, rear side and an entrance at one end conforming essentially to the size of an animal to be trapped, said top side of said housing comprising a longitudinal track;

(b) a pair of vertical uprights on opposite sides of said entrannce, each upright having an opposing vertically extending track;

(c) a spring biased guillotine member having outwardly extending arms received in said tracks in said uprights and being capable of reciprocating between an open set and closed tripped position in relation to said opening, said guillotine member having at least one detent for releasably engaging said top side of said housing assembly and adapted to retain said guillotine member in said open set position;

(d) a spring biased striker member slidable in said longitudinal track from a retracted position to a tripped position, said striker member including a recess facing said top side of said housing, said recess adapted for releasably engaging a bait lever when in said retracted position, said striker adapted for impacting said guillotine member while in said open set position whereby said detent is disengaged from said housing; and (e) said bait lever being pivotally mounted in said housing said bait lever having a detent for releasably engaging said recess in said striker member and holding said striker member in said retracted position away from said guillotine member.

* * * * *